United States Patent Office

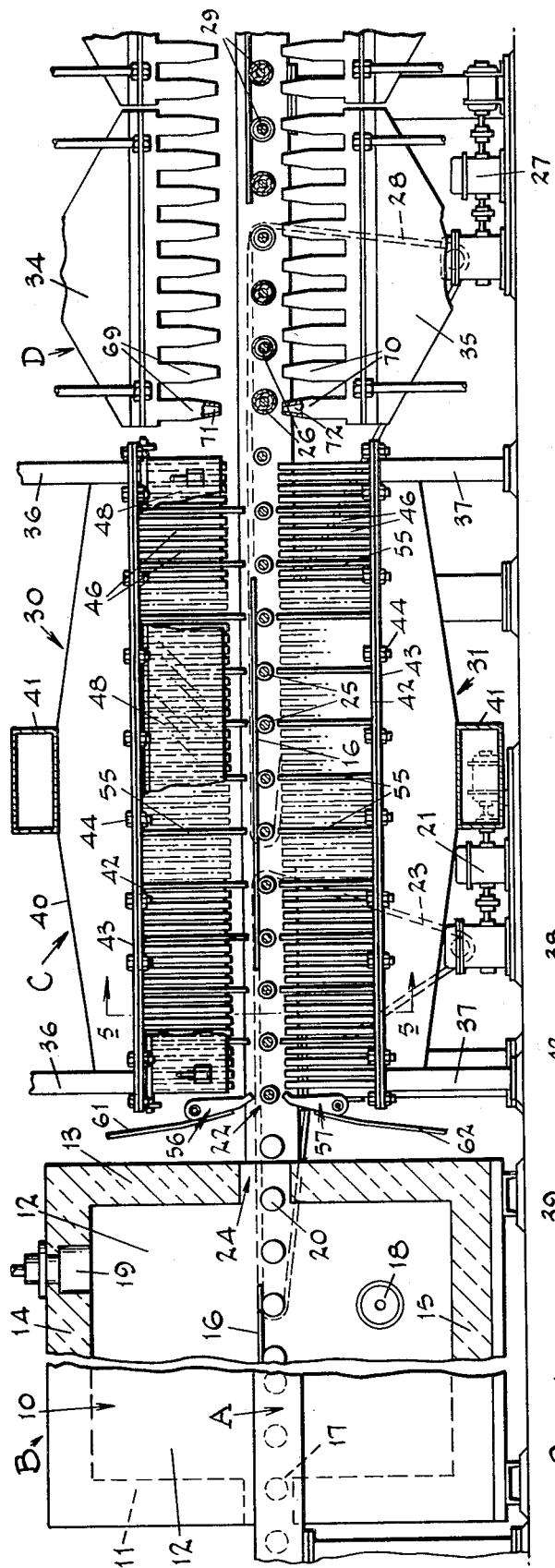
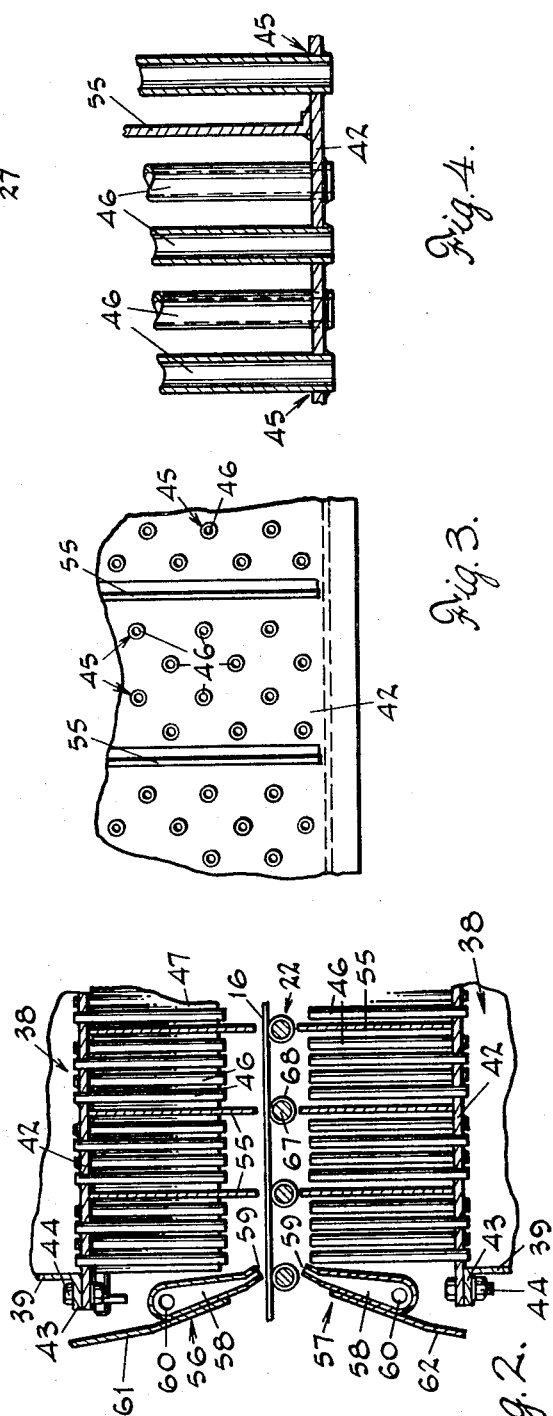
INVENTORS
George F. Ritter, Jr. and
Frank J. Hymore
BY
Collins & Oberlin
ATTORNEYS INVENTORS
George F. Ritter, Jr. and
Frank J. Hymore
BY
Collins & Oberlin
ATTORNEYS

3,672,861
Patented June 27, 1972

3,672,861
APPARATUS FOR TEMPERING FLAT SHEETS OR PLATES OF GLASS
George F. Ritter, Jr., Toledo, and Frank J. Hymore, Oregon, Ohio, assignors to Libbey-Owens-Ford Company, Toledo, Ohio
Filed Nov. 16, 1967, Ser. No. 683,581
Int. Cl. C03b 27/00
U.S. Cl. 65—350                    5 Claims

ABSTRACT OF THE DISCLOSURE

Tempering thin sheets of flat glass, for example 1/8 inch, by conveying heated sheets to be tempered horizontally between a plurality of upper and lower tubular members which direct individual streams of cooling fluid, under relatively high pressure, against opposite surfaces of the sheet to temper the same, the pressure of the cooling fluid directed against the bottom surface of the sheet being relatively greater than that applied to the upper surface, a volume of back-up air being maintained above the sheet to compensate for the higher pressure applied to the bottom of the sheet and the tubular members above and beneath the sheet being separated into a plurality of groups to minimize turbulence of the cooling fluid.

---

The present invention relates to an improved method of and apparatus for producing flat tempered glass sheets or plates.

In well-known commercial procedures for tempering glass sheets or plates, sheets are first heated to a temperature corresponding substantially to the softening point of the glass and then tempered by chilling the sheet to a temperature below the annealing range of the glass. Conventionally, the heated sheet is received from the furnace upon a series of horizontally disposed conveyor rolls which carry the sheet forwardly between upper and lower blastheads which flush the opposite surfaces of the sheet with streams of a suitable cooling fluid, such as air under predetermined pressure, to chill the glass and impart the desired stresses therein. When tempering flat sheets of glass having a nominal thickness of 1/4 inch, the cooling air is directed against opposite surfaces of the sheet at a relatively low pressure, for example, approximately 2" to 5" water column. While this procedure has been found entirely satisfactory for tempering glass sheets of 1/4", it is not commercially practical for tempering thinner sheets, for example, 1/8 inch, the demand for which is constantly increasing for various applications.

It is well known in the art that, as the thickness of the glass sheet to be tempered decreases, the rate of cooling of the sheet from the elevated temperature to a temperature below the annealing range of the glass must be increased to produce a given temper. However, it has been found that thin sheets of glass cannot be satisfactorily tempered by simply increasing the air pressure directed against the glass sheet according to the above procedure. Among the disadvantages encountered in the use of increased air pressure is that the sheet is subjected to considerable "fluttering" as it is carried along upon the conveyor rolls, rendering it impossible to maintain the required sheet flatness and resulting in excessive breakage. It would appear, off-hand, that this objection could be overcome by simply increasing the pressure of the air on the upper surface of the sheet sufficient to hold the sheet down on the conveyor rolls; however, this is not the case and only adds to the problem by causing an upward bowing of the sheet, due to this differential in air pressure directed upon the sheet surfaces.

It is therefore an important object of this invention to provide an improved method of and apparatus for tempering thin sheets of flat glass as said sheets are moved along a predetermined horizontal path.

Another object of the invention is the provision of such a method and apparatus wherein the flatness of the glass sheets can be maintained and breakage of the glass minimized, while providing a desired breaking pattern in the finished sheet.

Another objtect of the invention is the provision of such a method and apparatus wherein the pressure of the cooling air directed against the bottom surfaces of the glass sheets is relatively greater than that applied to the upper surfaces thereof, and further, in which a back-up volume of air is established above the glass sheets sufficient to compensate for the increased pressure against the bottom surfaces to maintain the sheets in said predetermined path.

A further object of the invention is the provision of such a method and apparatus wherein the streams of cooling air above and beneath the path of travel of the glass sheets are separated into a plurality of isolated groups such as to reduce turbulence by preventing intermingling of the cooling air from said groups before contacting the sheets.

Other objects and advantages of the invention will become more apparent during the course of the following description when taken in connection with the accompanying drawings.

In the drawings, wherein like numerals are employed to designate like parts throughout the same:

FIG. 1 is a longitudinal vertical section through tempering apparatus constructed in accordance with this invention;

FIG. 2 is a longitudinal vertical section through a portion of the chilling section;

FIG. 3 is a plan view of a portion of one of the tempering blastheads;

FIG. 4 is a detail vertical section of a portion of one of the tempering blastheads;

Figure 5:
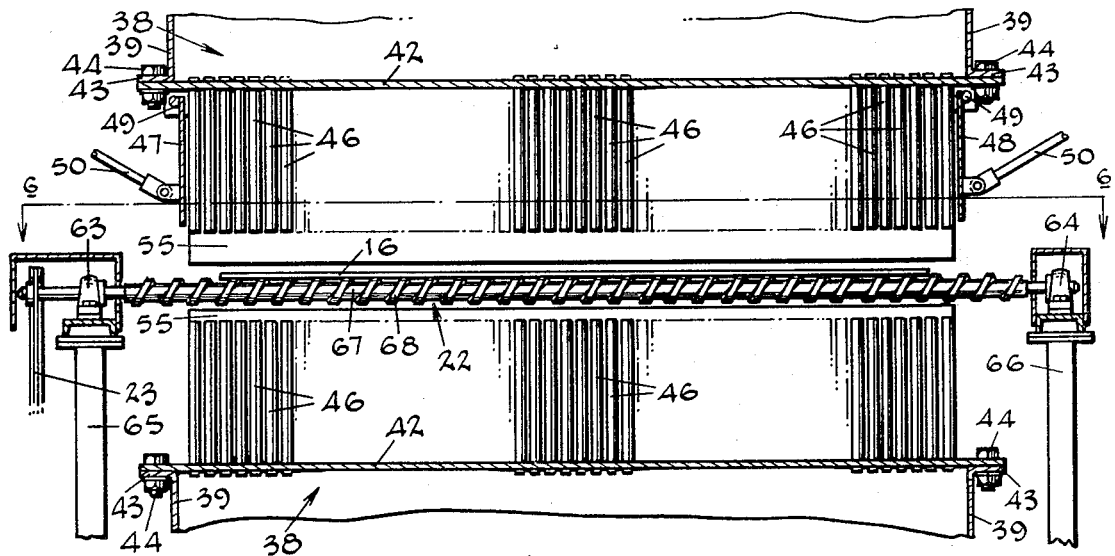
FIG. 5 is a transverse sectional view through the chilling section taken along line 5—5 of FIG. 1.
Figure 6:
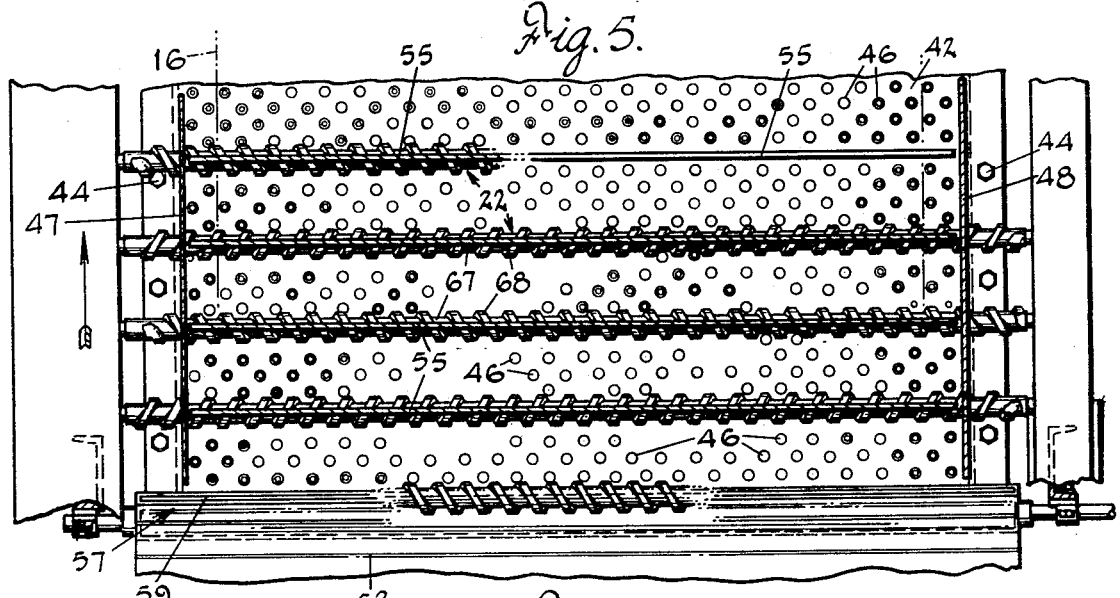
Figure 8:
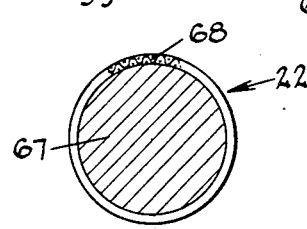
Figure 7:
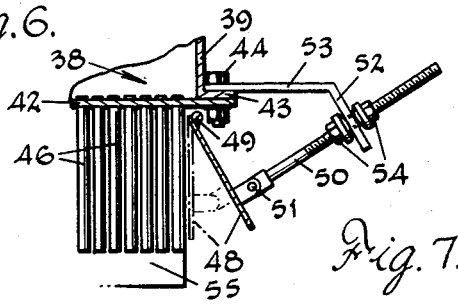
Figure 9:
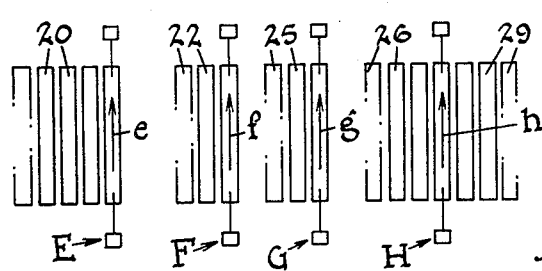

FIG. is a transverse horizontal section taken along line 6—6 of FIG. 5;

FIG. 7 is a detail view showing one of the damper plates associated with the upper tempering blasthead;

FIG. 8 is a cross-section of one of the conveyor rolls in the chilling section; and FIG. 9 is a diagrammatic view of the conveyor system for the glass sheets.

Referring now to the drawings, and particularly to FIG. 1, there is shown an apparatus for tempering a flat glass sheet or succession of glass sheets in accordance with this invention. This apparatus includes generally a roller conveyor system A, a heating furnace B, a tempering or chilling section C arranged in close proximity to the exit end of the furnace for receiving the heated sheets therefrom, and a cooling section D adjoining section C.

The furnace B comprises a substantially closed heating chamber 10 defined by a front wall 11, side walls 12, rear wall 13, top wall 14, and floor or bottom 15. Flat glass sheets 16 to be tempered are carried through the heating chamber along a substantially horizontally disposed path by the roller conveyor system A, which includes a series of rolls 17 in the entry and medial area of the heating chamber 10. The heating chamber 10 is maintained at regulated temperatures by burners 18 located in the side walls 12 beneath the conveyor rolls 17 and by similar burners 19 in the top wall 14. The burners 18 and 19 are preferably arranged and controlled to provide heat patterns or zones of progressively increasing temperatures from the entry end to the exit end of the furnace.

As the glass sheets 16 are carried through the heating chamber 10, they are progressively heated from room temperature to substantially the softening point of the glass at which all strain will be relieved. The rate of movement of the glass sheets during each phase of the operation is controlled so as to be commensurate with the operation being performed on the sheet during that phase. Thus, the speed of movement of the sheets is varied throughout the process to move them through the furnace B at one speed, from the furnace to the chilling section C at a faster speed so that the sheets will lose a minimum of heat during this transfer, through the chilling section at a slower speed to enable utilizing relatively small equipment to perform this function, from the chilling section to the cooling section D at a faster speed, and then through the cooling section at a slower speed.

In this connection, as the glass sheets 16 approach the exit end of the furnace, they are received on rolls 20 of the conveyor system A which are driven in common from a variable speed power source 21 with rolls 22 in the entry area of the chilling section C through a chain drive 23. Upon reaching the exit end of the furnace, the heated glass sheets 16 pass through a slotted opening 24 in the rear wall 13 and are received on a series of conveyor rolls 22 in the entry area of the chilling section C and then continue forwardly onto conveyor rolls 25 in the exit area thereof. Rolls 25 are driven in common with rolls 26 in the entry area of the cooling section D from a power source 27 of variable speed transmission through a chain drive 28. Generally speaking, the glass sheets, in succession, are moved through the apparatus at preselected rates of relatively slow or faster speeds commensurate with the desired periods of time in which they are moved from one section to another as from the furnace B into the chilling section C and from the section C into cooling section D.

Thus, while the conveyor rolls 17 in the entry and medial areas of the furnace B are driven by a power source (not shown) at a constant linear speed of about 200 inches per minute, the rolls 20 adjacent the exit end of the furnace and the rolls 22 in the entry area of the chilling section C are adapted to be alternately driven at either 200 inches per minute or at a relatively higher speed of about 1000 inches per minute. Likewise, the conveyor rolls 25 which remove the glass sheets 16 from the chilling section C and the rolls 26 in the entry area of the cooling section D are alternately driven at a rate of speed comparable to the desired high rate of speed, i.e., 1000 inches per minute, and at a reduced rate of speed equal to that, as of 200 inches per minute, at which the conveyor 29 which extend through the remainder of the cooling section D are driven.

In conveying the glass sheets through the apparatus, the flat glass sheets to be tempered are introduced into the entrance end of the heating chamber 10 onto the conveyor rolls 17 and during their passage through the furnace B are gradually heated to the softening point of the glass. With reference particularly to FIGS. 1 and 9, as each succeeding sheet approaches the exit end of the heating chamber 10, it is received on the conveyor rolls 20 and in due course the leading edge of the sheet intercepts the beam e of a signal device E which actuates the power source 21 to increase the speed of movement of the conveyor rolls 20 and 22 and the sheet from about 200 to about 1000 inches per minute whereby to carry the sheet rapidly forwardly into the chilling section C, and between the upper and lower blastheads 30 and 31, with a minimum of heat loss to the atmosphere.

As the glass sheet becomes bodily positioned between the opposed blastheads 30 and 31 in the chilling section C, the leading edge of the sheet will intercept the light beam f of a second signal device F which will again actuate the power source 21 to cause the conveying speed of the rolls 20 and 22, as well as the sheet, to be reduced to about 200 inches per minute while the sheet is moved through the section C and received on the series of conveyor rolls 25 which are at this time moving at the same speed.

When the glass sheet reaches the exit end of chilling section C the leading edge thereof will interrupt the light beam g of a third signal device G to actuate the power source 27 to increase the rate of speed of the rolls 25 and 26, and that of the sheet, to about 1000 inches per minute to transfer the sheet rapidly into the cooling section D between the upper and lower blastheads 34 and 35 and wherein the temperature of the sheet is progressively reduced. Finally, when the sheet is bodily received between the blastheads 34 and 35, the leading edge thereof interrupts the light beam h of a fourth signal device H to cause the power source 27 to reduce the rate at which the rolls 25 and 26 are driven so that the sheet will be moved forwardly onto the rolls 29 and through the balance of the cooling section at about 200 inches per minute, which is the speed at which said rolls 29 are operated.

Generally speaking, the length of the blastheads 30 and 31 and the different speeds at which the glass sheets move into, through and out of the chilling section C, should be so related to one another that sheets having a nominal thickness of ⅛ inch will remain in the chilling section for a minimum of 4.5 seconds to obtain the desired temper.

The upper and lower blastheads 30 and 31 in the chilling section C are of tube-type construction and are supported by structural members 36 and 37, respectively. Each blasthead comprises a plenum chamber 3 formed by a casing including a continuous side wall 39, an outer wall 40 provided with an air inlet 41, and an inner closure wall 42 disposed parallel to the path of travel of the glass sheets and secured to a continuous flange 43 formed on side wall 39 by bolts or other suitable securing means 44.

The closure 42 of each blasthead is provided, as shown in FIG. 3, with a plurality of regularly arranged and closely spaced openings 45 communicating with tubular members 46 fixed to the said wall 42. The tubular members 46, which will be hereinafter referred to as tubes, extend perpendicularly from the closure wall 42 and are directed toward the path of travel of the glass sheets. As illustrated in FIG. 4, the inner ends of the tubes are received within said openings 45 and are welded or otherwise suitably secured to the closure wall. The tubes 46 are thus arranged in a plurality of longitudinal and transverse rows, with the tubes in adjacent rows being staggered with respect to one another. As the glass sheets pass between the blastheads 30 and 31, individual streams of cooling air are directed against opposite surfaces of the sheet both longitudinally and transversely thereof to effect rapid chilling of the sheet to temper the glass.

As pointed out above, when tempering thin sheets of flat glass, such as those having a nominal thickness of ⅛", the cooling fluid, which is usually air, must be directed against the opposite sheet surfaces at a relatively high pressure, i.e., in excess of 20" water column (W.C.). However, it has been found that satisfactory tempering of the sheet cannot be obtained by directing the same amount of pressure against both sheet surfaces. This is because the sheet, in traveling through the furnace, picks up heat from the conveyor rolls, with the result that upon leaving the furnace the bottom surface of the sheet is at a relatively higher temperature than the upper surface. Therefore, to obtain uniform tempering of the sheet surfaces this temperature differential must be equalized in the chilling section. To accomplish this, air at a relatively higher pressure is directed against the bottom surface of the sheet than against the upper surface thereof. It has been found that the pressure of the air directed against the upper sheet surface is preferably from 30" to 35" water column (W.C.) and against the bottom sheet surface from 35" to 40" water column (W.C.) depending upon the temperature differential between the surfaces of the sheet when it leaves the furnace. Two typical examples are set forth below.

EXAMPLE 1

Temperature:
Upper sheet surface 1100° F.
Bottom sheet surface 1160° F.
Air pressure:
Upper sheet surface 30" W.C.
Bottom sheet surface 37" W.C.

EXAMPLE 2

Temperature:
Upper sheet surface 1125° F.
Bottom sheet surface 1135° F.
Air pressure:
Upper sheet surface 33" W.C.
Bottom sheet surface 35" W.C.

In each of the above examples, the tubes 46 were arranged in 48 transverse rows, with 23 tubes in each row. The tubes in each transverse and longitudinal row were spaced on 1½ inch centers, while the staggered tubes were on $15/16$ inch centers. The tubes were 10" long, had an internal diameter of .407 inch and were spaced at their inner ends 1⅛ inch from the glass stheets moving along the conveyor.

It has also been found that, with tube-type tempering apparatus as described above, the use of a greater pressure against the bottom surface of the sheet than against the upper surface, coupled with the back pressure of the air within the bottom blasthead, presents a serious drawback in that, due to the thinness of the sheet, there is a decided tendency for the sheet to flutter on the conveyor rolls, thereby adversely affecting the flatness of the sheet and resulting in excessive breakage. In fact, if the pressure differential is too great the sheet will tend to float off of the conveyor rolls into contact with the tubes of the upper blasthead.

To overcome this, the present invention contemplates the provision of means for retaining a relatively large volume of back-up air above the glass sheet sufficient to hold the sheet down on the conveyor rolls but which does not serve to further temper the glass. Thus, there are arranged at opposite sides of the upper blasthead 30 damper plates 47 and 48, each being pivoted at its upper end as at 49 to the closure wall 42 of the plenum chamber and being adjustable by a rod 50 pivoted at its inner end to the damper plate as at 51, said rod passing through an opening in the angled end 52 of bracket 53 and having threaded thereon nuts 54 whereby the damper plate can be swung inwardly or outwardly about pivot 49 and secured in desired position.

The damper plates 47 and 48 extend the entire length of the blasthead and when in vertical position, as shown in FIG. 5, will lie flat against the tubes and thereby restrict the loss of air at the opposite sides of the blasthead. In other words, the damper plates will serve to confine the air between the tubes and thereby build up and maintain a relatively large volume of back-up air between the tubes sufficient to compensate for the greater pressure against the bottom surface of the sheet and hold the sheet down on the conveyor rolls.

It has been further found that the ejecting of the air from the tubes 46 at relatively high pressures results in a great deal of turbulence within the blastheads, which is sufficient to blow the sheet off of the conveyor rolls and "jam up" between the blastheads. To overcome this, the tubes are separated into a plurality of groups by means of baffle plates 55, preferably of metal. As shown in FIG. 1, these baffle plates extend transversely of the path of travel of the glass sheets and are welded or otherwise suitably secured at their inner ends to the respective closure wall 42 of the plenum chamber. Preferably, the tubes are separated into groups of four rows each. The baffle plates 55 for the upper and lower blastheads are also preferably disposed in alignment with one another and project slightly beyond the inner ends of the tubes. The purpose of the baffle plates is that they serve as modulators to reduce the influence of constantly changing air turbulence within the blastheads. For instance, when no glass is located between the blastheads, air escapes at the path of least resistance. As a glass sheet enters the blastheads the sheet acts as a gate which upsets the normal flow of air rather violently and creates objectional air turbulence between the tubes. However, by use of the baffle plates 55 every four rows of tubes is isolated from adjacent rows and in this way, intermingling of the air between adjacent groups with resulting turbulence will be minimized.

As is well known, when tempering glass sheets by subjecting the heated sheets to streams or jets of a cooling fluid such as air, the surfaces of the sheets are placed under compression and the interior of the sheet under tension. This is effected within a matter of seconds and therefore, the back pressure of air retained between the tubes of the upper and lower blastheads will not interfere with the temper of the glass.

Since the chilling section C is positioned relatively close to the exit end of the furnace B, it is important that provision be made for preventing the cooled air from the blastheads form blowing back into the furnace, which would result in a temperature drop in the furnace requiring boosting of the normal gas pressure to maintain the required furnace temperatures.

To this end, there are provided in advance of and closely adjacent the upper and lower blastheads 30 and 31 the air shields 56 and 57, respectively, each consisting of a horizontally disposed manifold 58 having a relatively narrow outlet slot 59 directed toward the path of travel of the glass sheet and closely adjacent thereto. Each manifold is provided at one or both ends with an inlet opening 60 to which may be connected a source of air under pressure. The air introduced into the manifolds is discharged therefrom between the blastheads and the pressure of the air is such as to reduce to a minimum the blowback of air into the furnace through the outlet opening 24 in the rear wall 13. Metal shields 61 and 62 may also be secured to the manifolds 58 to serve as additional barriers against the flow of air into the furnace. The shields 56 and 57 also serve a second important function which is to permit the entry of the glass sheets into the air blast created between the blastheads.

The rolls of the conveyor system A, in its entirety, are mounted at their opposite ends in bearings 63 and 64 supported along the sides of the apparatus by pedestals 65 and 66, as in FIG. 5, or in any other suitable manner. The rolls 22 and 25 in the chilling section C are of a special type to effect better distribution of the air directed against the bottom surfaces of the glass sheets and to also maintain the glass sheets in a straight path as they are carried along by said rolls. Thus, each of these rolls comprises a metal shaft 67 which is wrapped with a suitable tape 68 of a non-abrasive material, such as fiber glass or asbestos, which will not mar the surface of the glass sheet. The tape is wrapped spirally around the shaft from one end thereof to the other, with the convolutions of the tape being spaced from one another as clearly shown in FIG. 5. The tape on adjacent rolls is wrapped in opposite directions, i.e., alternately right and left hand, to eliminate any transverse "walking" tendency of the glass sheets. The spiral is preferably wound "fast" so that the surface contact between the tape and the roll shaft is about 35 degrees. The tape wrapping on the conveyor rolls reduces the area of contact between the rolls and glass sheets, while the spacing between the convolutions of the tape provides relief areas which permit more uniform distribution of the cooling air beneath the sheets. In the absence of these relief areas, the cooling air would be substantially confined between adjacent conveyor rolls and cause "ballooning" of the thin glass sheets.

As the tempered glass sheets leave the chilling section

C they are received between one or more pairs of upper and lower blastheads 34 and 35 in cooling section D. Blasts of cooling air are directed by the blastheads upon the opposite surfaces of the tempered glass sheet in a well known manner to continue cooling of the sheets. The blastheads 34 and 35 here shown are provided with spaced fins 69 and 70, respectively, extending transversely of the path of travel of the sheets and having slotted openings 71 and 72 to direct long, narrow streams of air upon opposite surfaces of the sheets passing therebetween. The degree of cooling of the glass sheets is controlled by the pressure of the air and differential air pressures are applied to the upper and lower sheet surfaces. During movement of the tempered sheets through the cooling section, air under relatively low pressure, such as 2" to 5" water column (W.C.), is applied to the opposite surfaces of the sheet. However, the pressure of the air upon the upper surface of the sheet should be sufficiently greater than that applied to the lower surface such as to lightly maintain the sheet on the conveyor rolls without "drifting."

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. Apparatus for tempering flat glass sheets, comprising a roll conveyor for supporting and moving a sheet along a substantially horizontal path through a heating area, a chilling area and a cooling area disposed along said path, means in said heating area for heating the sheet to substantially the softening point of the glass, means comprising tubular members in said chilling area for directing a plurality of individual but closely spaced streams of cooling fluid under relatively high pressure against the opposite surfaces of the glass sheet moving therebetween both longitudinally and transversely thereof to temper the same, with the pressure of the streams of cooling fluid directed against the bottom surface of the sheet being relatively greater than those directed against the upper surface thereof, and means at opposite sides of said chilling area above said path for retarding the escape of cooling fluid therefrom whereby to establish a volume of back-up cooling fluid sufficient to compensate for the increased pressure against the bottom surface of the sheet to maintain said sheet on said roll conveyor, said retarding means including movable damper plates for regulating the amount of cooling fluid permitted to escape.

2. Apparatus for tempering flat glass sheets, comprising upper and lower plenum chambers, each having an inwardly facing closure wall, a plurality of tubular members carried by each closure wall and communicating with the respective plenum chamber, the upper and lower tubular members extending perpendicularly from said respective closure wall and spaced from one another at their inner ends, a plurality of conveyor rolls positioned between the spaced inner ends of said upper and lower tubular members for conveying a heated glass sheet to be tempered therebetween, said tubular members being adapted to direct a plurality of individual but closely spaced streams of a cooling fluid against opposite surfaces of the sheet to temper the same, a plurality of partitioning baffle plates separating the upper and lower tubular members into a plurality of groups, and movable damper plates arranged at opposite sides of the cooling tubes of the upper plenum chamber for controlling the amount of cooling fluid permitted to escape.

3. Apparatus for tempering flat glass sheets as defined in claim 2, including air shields positioned at the forward end of the plenum chambers for directing air under pressure between said plenum chambers above and beneath the conveyor rolls to retard the escape of cooling fluid.

4. Apparatus for tempering flat sheets of glass, comprising upper and lower plenum chambers, each having an inwardly facing closure wall, a plurality of tubular members carried by each closure wall and communicating with the respective plenum chamber, the upper and lower tubular members extending perpendicularly from said respective closure wall and spaced from one another at their inner ends, a plurality of conveyor rolls positioned between the spaced inner ends of said upper and lower tubular members for conveying a heated glass sheet to be tempered therebetween, said tubular members being adapted to direct a plurality of individual but closely spaced streams of a cooling fluid against opposite surfaces of the sheet to temper the same, each of said conveyor rolls including a shaft and a covering of a non-abrasive material for said shaft, said covering comprising a tape wrapped spirally around said shaft to provide spaced convolutions with relief areas therebetween for the horizontal passage of cooling air between said shaft and said sheet.

5. A pparatus for tempering flat glass sheets as defined in claim 4 in which the tape on the shafts of adjacent rolls is wrapped in opposite directions.

References Cited
UNITED STATES PATENTS

| | | | |
|---|---|---|---|
| 1,909,948 | 5/1933 | Halbach | 65—374 X |
| 2,376,872 | 5/1945 | Harris | 65—115 |
| 3,223,500 | 12/1965 | Misson | 65—114 X |
| 3,265,484 | 8/1966 | Ritter, Jr. | 65—104 |
| 3,353,946 | 11/1967 | McMaster | 65—351 X |
| 3,454,389 | 7/1969 | O'Connell et al. | 65—114 X |

ARTHUR D. KELLOGG, Primary Examiner

U.S. Cl. X.R.

65—114, 351